(12) United States Patent
Wu

(10) Patent No.: US 6,170,592 B1
(45) Date of Patent: Jan. 9, 2001

(54) DETACHABLE FRAMEWORK FOR AN ELECTRIC CART

(76) Inventor: Donald P. H. Wu, No. 169, Ken Tzu Ku, Shang Ken Tsun, Hsin Feng Hsiang, Hisnchu County (TW)

( * ) Notice: Under 35 U.S.C. 154(b), the term of this patent shall be extended for 0 days.

(21) Appl. No.: 09/329,912

(22) Filed: Jun. 9, 1999

(51) Int. Cl.[7] .................................................. B62D 61/00
(52) U.S. Cl. ........................ 180/208; 180/210; 180/65.1
(58) Field of Search .................................. 180/210, 215, 180/216, 211, 217, 311, 312, 908, 65.1, 907, 89.13, 208; 280/638

(56) References Cited

U.S. PATENT DOCUMENTS

| | | | |
|---|---|---|---|
| 4,861,058 | * | 8/1989 | Cresswell .............................. 280/278 |
| 4,892,166 | * | 1/1990 | Gaffney ................................. 180/208 |
| 4,909,525 | * | 3/1990 | Flowers .................................. 280/30 |
| 5,074,372 | * | 12/1991 | Schepis ................................. 180/208 |
| 5,154,251 | * | 10/1992 | Fought ................................. 180/208 |
| 5,941,327 | * | 8/1999 | Wu ...................................... 180/65.1 |

FOREIGN PATENT DOCUMENTS

2133358A * 12/1992 (GB) .................................... 180/208

* cited by examiner

*Primary Examiner*—Brian L. Johnson
*Assistant Examiner*—G B Klebe
(74) *Attorney, Agent, or Firm*—Pro-Techtor International Services

(57) ABSTRACT

A detachable framework for an electric cart including a first chassis part, a second chassis part, and a connecting pin. The first chassis part has a steering handle for controlling a moving direction of a front wheel of the electric cart, a connecting pin receiver upward extended from a rear center thereof, and a connecting beam extended across a lower rear end thereof. The second chassis part has rear wheels and a driving mechanism mounted thereto and includes two receiving heads at its two lower front ends for receiving two ends of the connecting beam therein, a supporting post upward extended from a middle front thereof and having a first positioning screw on its front wall, and a seat post connected to a front top of the supporting post to locate immediately above the connecting pin receiver and having a second positioning screw provided on a front wall thereof. The connecting pin has a long lower portion vertically inserted into the seat post and the connecting pin receiver and a short upper portion for a seat connected thereto. When the first and the second positioning screws are turned to tightly press against the connecting pin receiver and the connecting pin in the seat post, respectively, the connected first and second chassis parts can be further firmly associated with one another even if they have been repeatedly disassembled and assembled many times.

17 Claims, 10 Drawing Sheets

DETACHABLE FRAMEWORK FOR AN ELECTRIC CART

BACKGROUND OF THE INVENTION

The present invention relates to a security framework for an electric cart, and more particularly to a detachable framework for an electric cart that includes a front and a rear part that can be secured together to form a complete piece or disassembled into two pieces for convenient transport of the electric cart.

In modern developed areas, automobiles have been widely used as a convenient transportation means. Due to the fact that the automobile consumes fuel and generates toxicant exhausts, the fuel engine automobiles have been partly replaced by electrically driven vehicles to reduce the air pollution. There is a common type of electrical vehicle developed mainly for housewives, the old and/or the disabled to help them move in short to mid distance and such an electric vehicle basically has a light weight and simple structure for easy manipulation.

Since such an electric vehicle is designed for short to mid distance, it is preferable that the electric vehicle can be easily carried to different locations when desired. For this purpose, it is preferable the vehicle is comprised of detachable parts so as to facilitate disassembly thereof. Electric carts having a two-piece chassis structure are available in the market. Such two-piece chassis usually includes a front and a rear chassis member that are, however, usually connected to each other simply by means of "insertion" of a portion of one chassis member into corresponding bore on the other chassis member. This causes a misalignment or relative shifting problem when the two chassis members have been repeatedly disassembled and assembled for many times. It is possible one of the two chassis members would turn about a major axis of the chassis relative to another chassis member and the whole electric cart can not operate in a stable manner.

Moreover, there are not connecting means provided to enhance the connection of the front chassis member to the rear chassis member, particularly at the transverse beams between the front and the rear chassis members, to keep, for example, a seat connected to a top of the front or the rear chassis member in a fixed state without becoming loosely movable when the electric cart is moving. A two-piece chassis having relatively turnable chassis members and looselymovable seat will, of course, adversely affect the use of the electric cart in an absolutely safe manner and the safety of an operator thereof.

In an earlier invention of the same inventor that has been filed a U.S. patent application under Ser. No. 08/947,395 and entitled "ELECTRIC CART WITH TWO PIECE CHASSIS", an improved two-piece chassis for an electric cart is disclosed. The present invention is made to provide a further improvement over the U.S. patent application Ser. No. 08/947,395, so that a detachable framework for an electric cart can be more conveniently and more securely assembled to ensure safe operation of the electric cart.

SUMMARY OF THE INVENTION

It is a primary object of the present invention to provide a detachable framework for an electric cart in which means are provided to push transverse beams of front and rear chassis parts of the framework against one another for them to always firmly and accurately connect together even the chassis parts have been repeatedly detached and assembled many times.

Another object of the present invention is to provide a detachable framework for an electric cart in which a seat is associated with the chassis parts in such a manner that when an operator sits on the seat, a torque is produced to cause the front and the rear chassis parts of the framework to more securely connect to one another.

To achieve the above and other objects, the detachable framework for an electric cart according to the present invention mainly includes a first chassis part, a second chassis part, and a connecting pin. The first chassis part has a steering handle for controlling a moving direction of a front wheel of the electric cart, a connecting pin receiver upward extended from a rear center thereof, and a connecting beam extended across a lower rear end thereof. The second chassis part has rear wheels and a driving mechanism mounted thereto and includes two receiving heads at its two lower front ends for receiving two ends of the connecting beam therein, a supporting post upward extended from a middle front thereof and having a first positioning screw on its front wall, and a seat post connected to a front top of the supporting post to locate immediately above the connecting pin receiver and having a second positioning screw provided on a front wall thereof. The connecting pin has a long lower portion vertically inserted into the seat post and the connecting pin receiver and a short upper portion for a seat connected thereto. When the first and the second positioning screws are turned to tightly press against a rear wall of the connecting pin receiver and a front wall of the connecting pin in the seat post, respectively, the connected first and second chassis parts can be further firmly associated with one another even if they have been repeatedly disassembled and assembled many times. And the seat may be always firmly and stably connected to the connecting pin without the risk of shifting forward or rearward to adversely affect a safe manipulation of the electric cart.

BRIEF DESCRIPTION OF THE DRAWINGS

The present invention will be better understood from the following detailed description of the preferred embodiments thereof, which are illustrative and not limitative, with reference to the accompanying drawings, wherein.

DETAILED DESCRIPTION OF THE PREFERRED EMBODIMENTS

Figure 1:
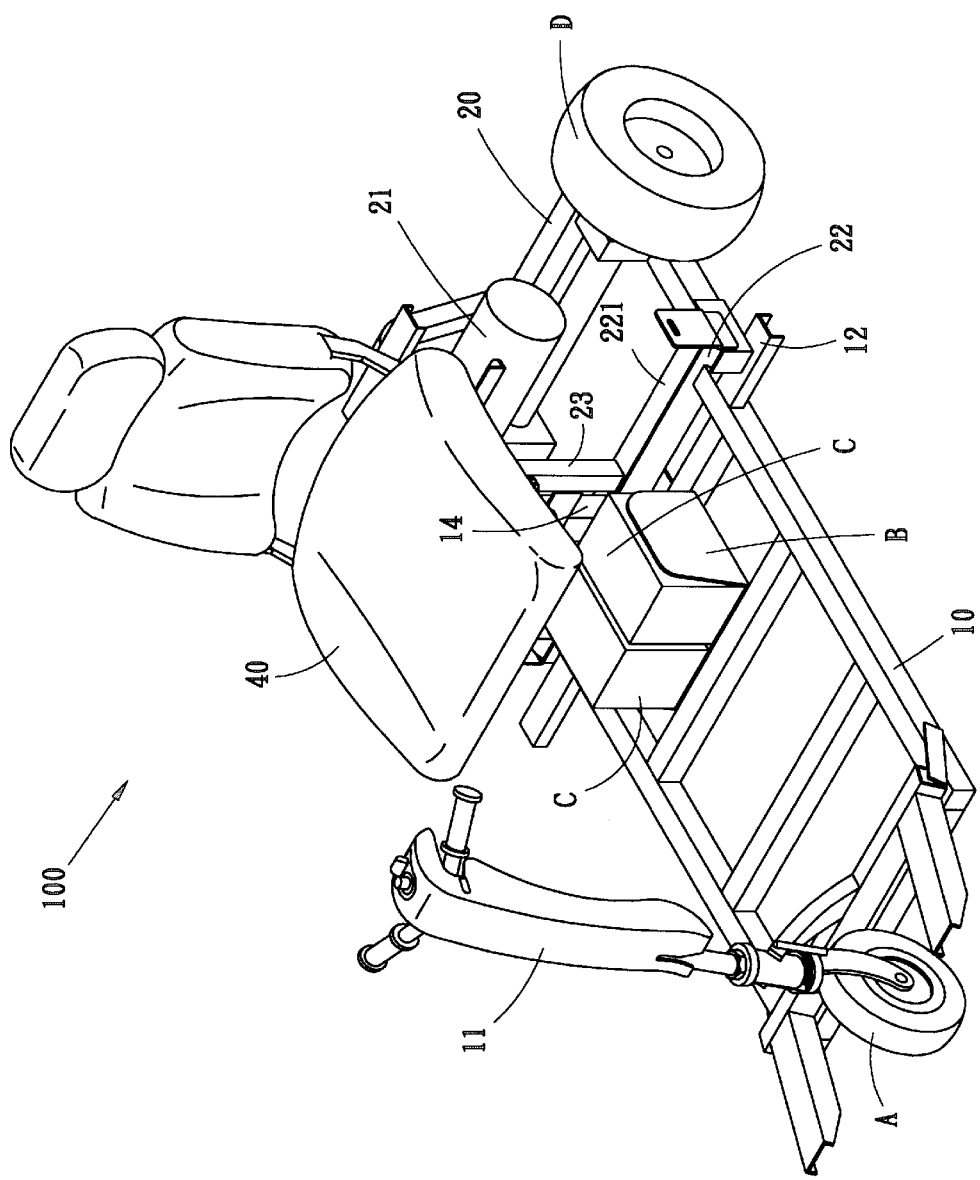
FIG. 1 is an assembled perspective of a detachable framework according to the present invention for use with a three-wheel electric cart.

Please refer to FIGS. 1 through 5 in which a three-wheel electric cart framework according to the present invention generally denoted by reference numeral 100 is shown. The electric cart with which the detachable framework 100 of the present invention is used may be either a three-wheel or a four-wheel cart. A description of the present invention hereunder is based on a three-wheel electric cart as illustrated. However, it is understood the detachable framework 100 of the present invention is by no means limited to the use only with a three-wheel electric cart.

As shown, the detachable framework 100 for an electric cart mainly includes a first or front chassis part 10, a second or rear chassis part 20, and a connecting pin 30.

Figure 2:
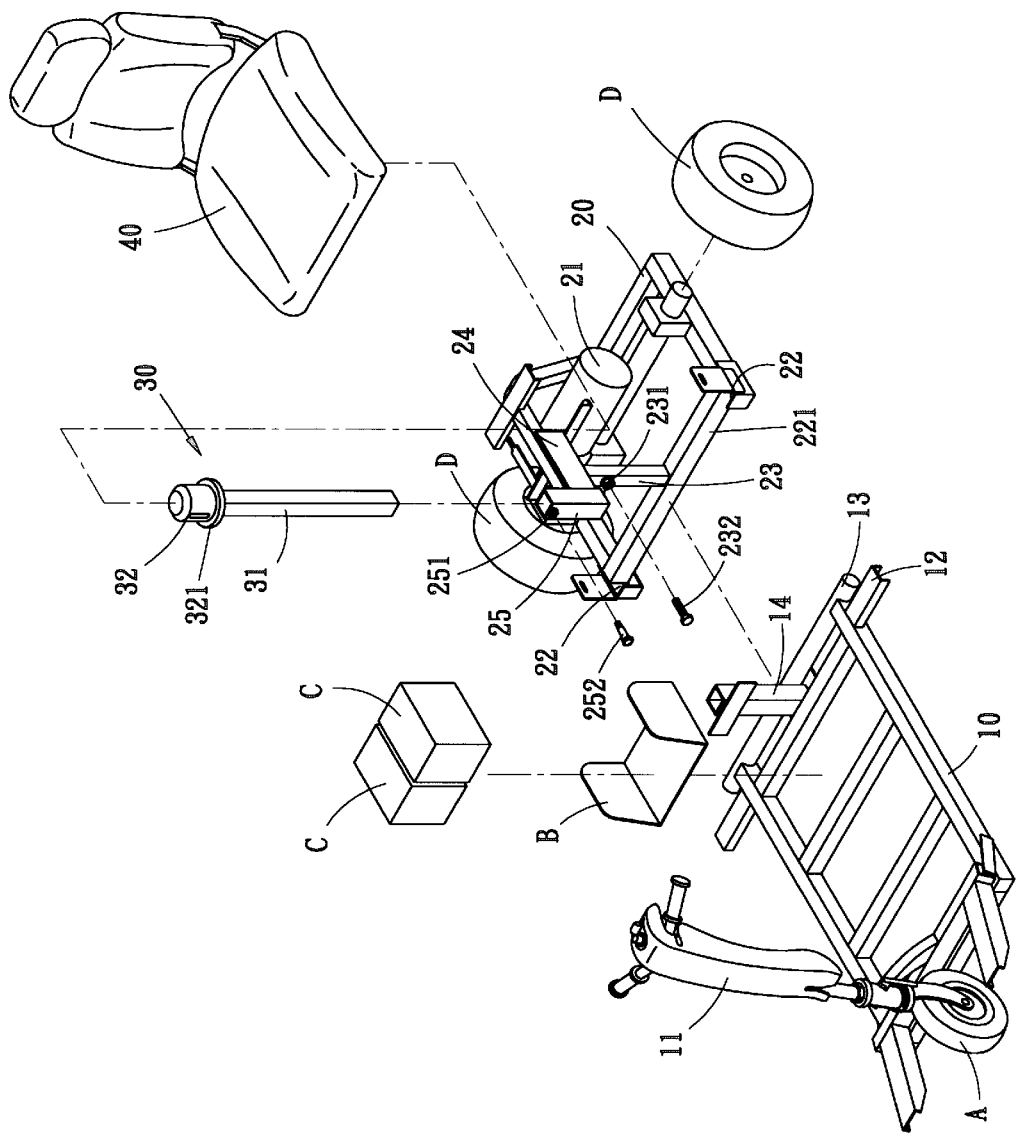
FIG. 2 is an exploded perspective of the detachable framework for an electric cart of FIG. 1.
Figure 3:
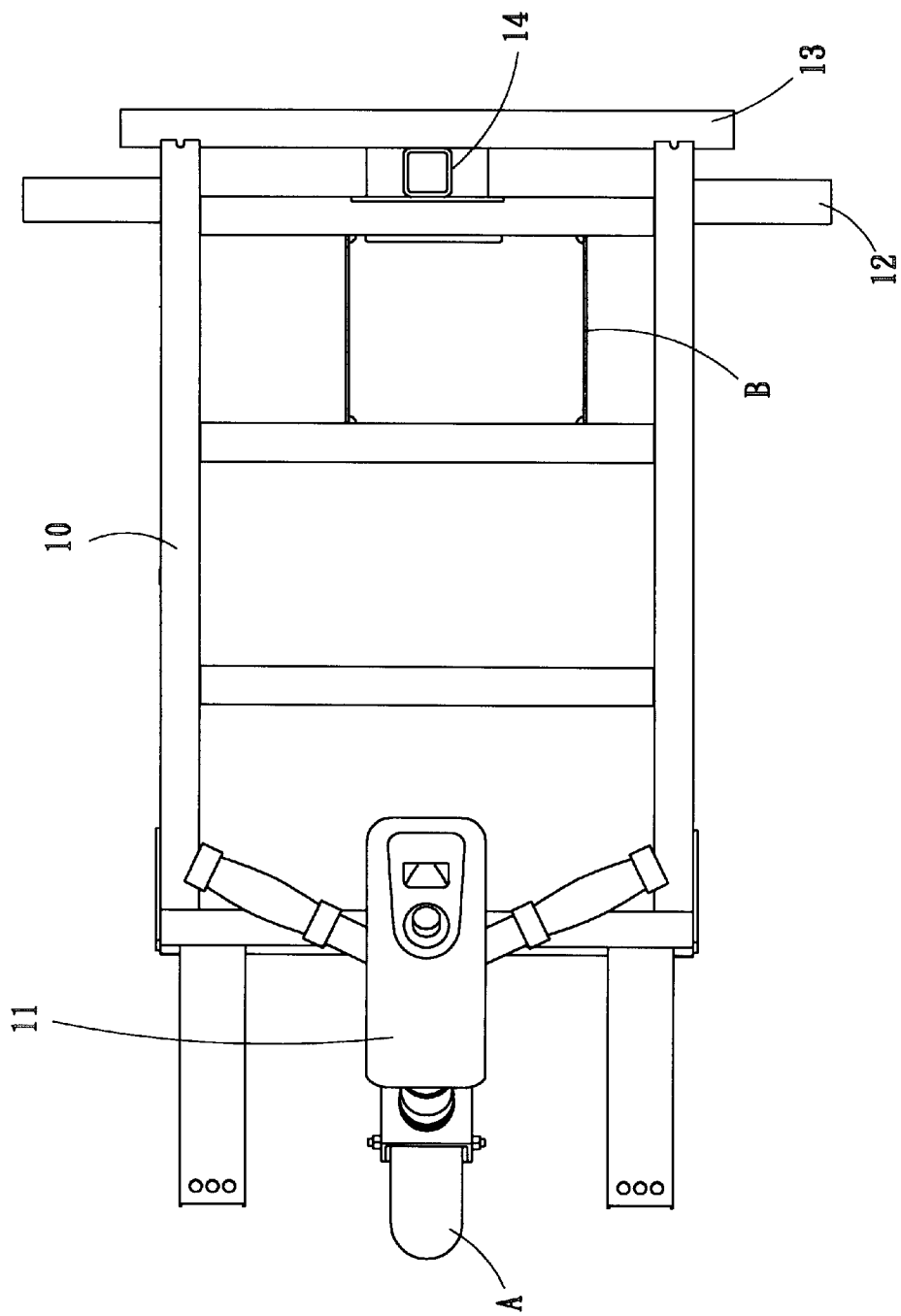
FIG. 3 is a top plan view of a first or front chassis part of the detachable framework of FIG. 1.
Figure 4:
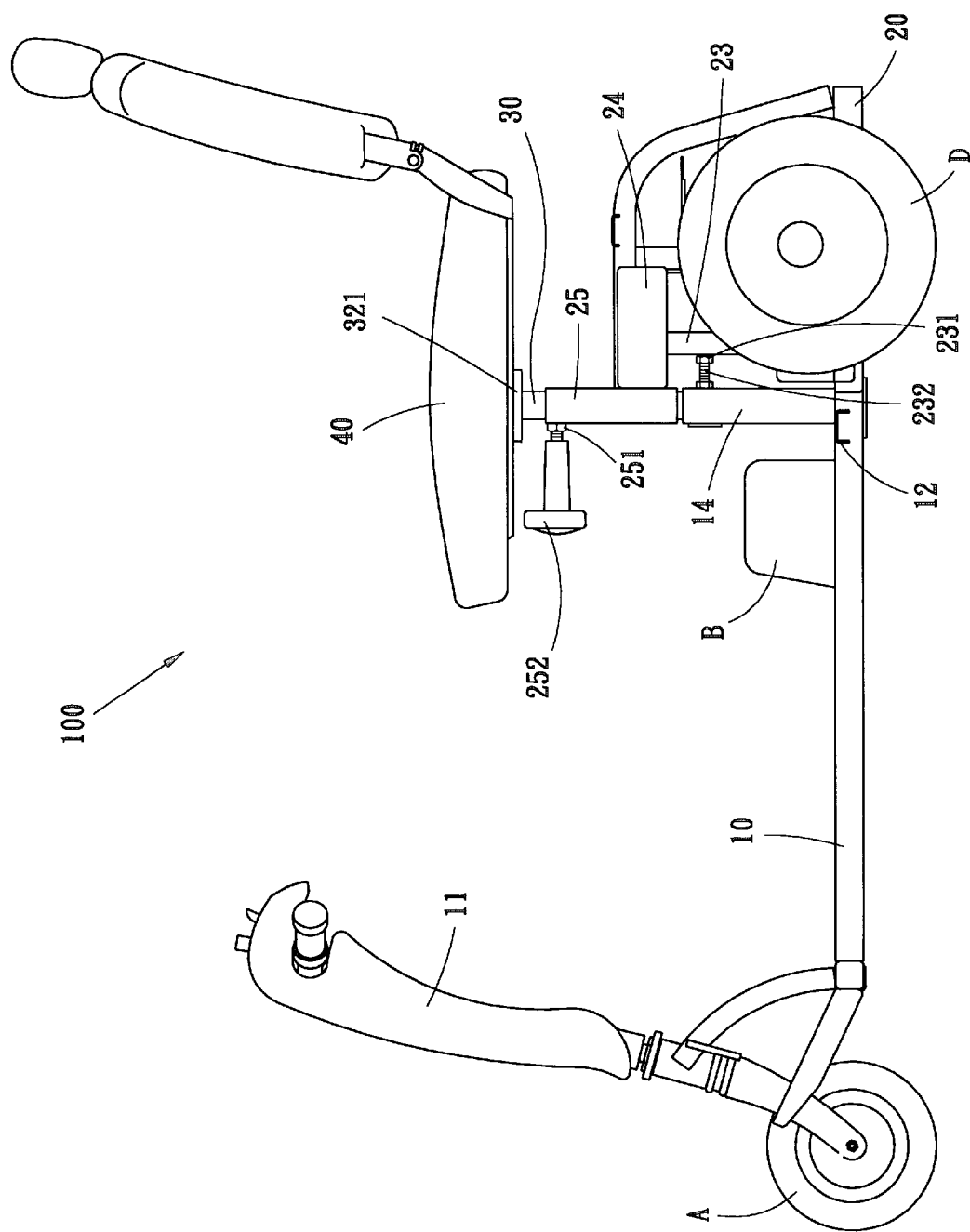
FIG. 4 is a side elevation of the detachable framework for an electric cart of FIG. 1.
Figure 5:
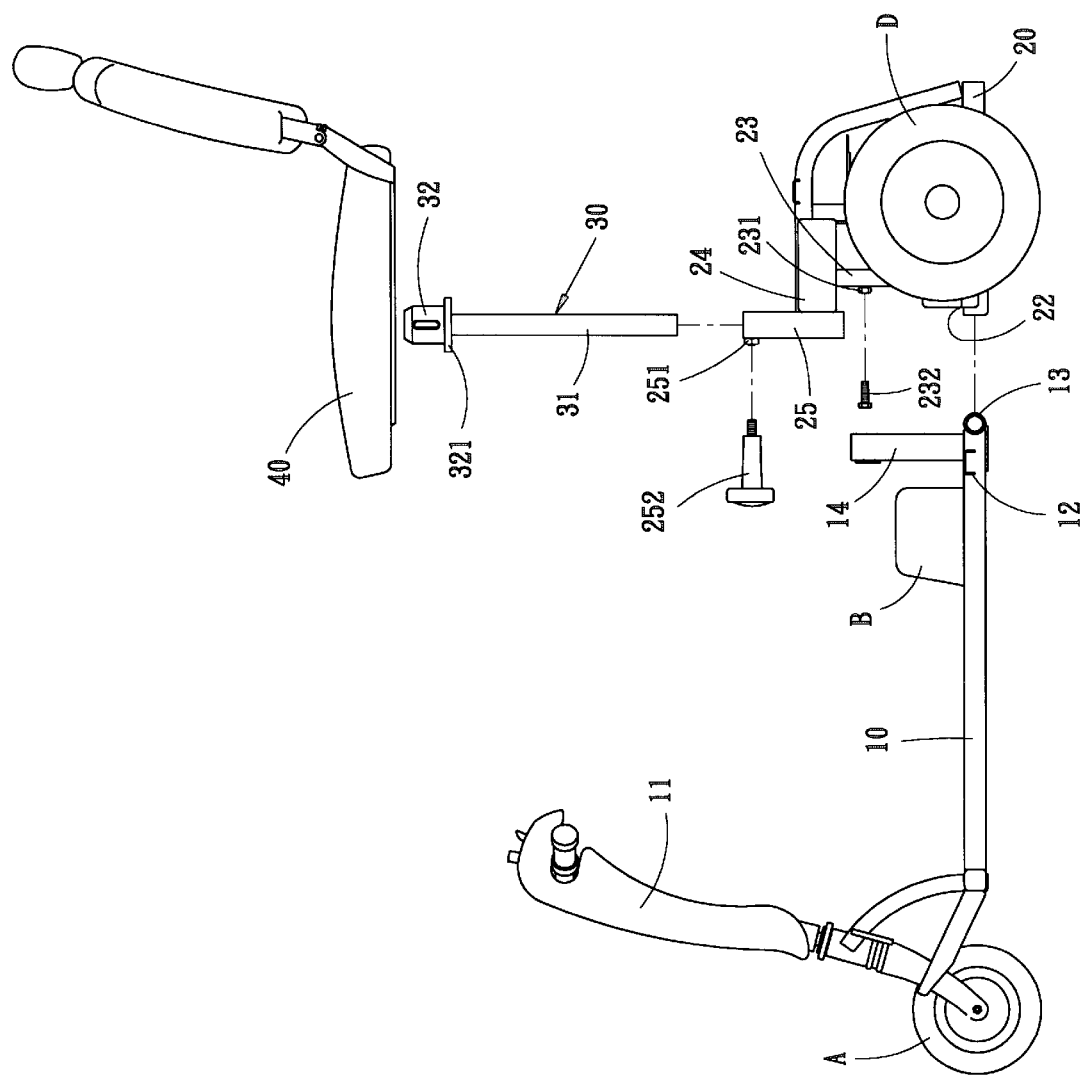
FIG. 5 is a side elevation showing the way of disassembling a second or rear chassis part from the first or front chassis part of the present invention.

The first chassis part 10 mainly includes a steering handle 11 mounted at a front end thereof for controlling a moving direction of a front wheel A of the electric cart and accordingly the entire electric cart framework 100, a major transverse beam 12 provided at a lower rear end of the first chassis part 10 for bearing a lateral downward force from the first chassis part 10, an auxiliary connecting beam 13 provided behind the major transverse beam 12 to parallel with and be slightly shorter than the major transverse beam 12 (see FIG. 5), and a connecting pin receiver 14 upward extended from a middle point of the major transverse beam 12 (see FIGS. 2 and 5). A battery receiver B having batteries C mounted therein is provided on the first chassis part 10 at a suitable position.

The second chassis part 20 has two rear wheels D connected to two lateral sides thereof and a driving mechanism 21 mounted at a predetermined position for driving the two rear wheels D. Since the manner and principles of driving the rear wheels D by the driving means 21 are not key points and scope of the present invention, they are not discussed herein. The second chassis part 20 includes two receiving heads 22 formed at two lower front ends thereof. The receiving heads 22 may be of any shape. In the illustrated drawings, the receiving heads 22 are two recesses for correspondingly receiving two lateral ends of the auxiliary connecting beam 13 of the first chassis part 10, such that the connecting beam 13 with two ends located in the receiving heads 22 is in parallel with and tightly abuts on a front transverse beam 221 of the second chassis part 20. Through the location of the auxiliary transverse beam 13 in the two receiving heads 22, the first chassis part 10 and the second chassis part 20 are primarily connected to one another. A supporting post 23 upward extends from a middle point of the transverse beam 221 corresponding to and in parallel with the connecting pin receiver 14 of the first chassis part 10, so that a small distance "X" is kept between the supporting post 23 and the connecting pin receiver 14 (see FIG. 6). A screw seat 231 is provided on a front wall of the supporting post 23 at a suitable position for a first positioning screw 232 to rotatably mount therein. By turning the first positioning screw 232 relative to the screw seat 231, the first positioning screw 232 may project from the supporting post 23 by different lengths. A horizontal supporting member 24 is connected to a top of the supporting post 23 and extends in a longitudinal direction of the framework 100, and a vertical seat post 25 is perpendicularly connected to a front end of the horizontal supporting member 24, so that the seat post 25 would just closely locate above the connecting pin receiver 14 to form a continuous hollow channel when the first chassis part 10 is associated with the second chassis part 20 by locating the auxiliary transverse beam 13 into the receiving heads 22. A threaded hole 251 is provided on a front wall of the seat post 25 at a predetermined position for a second positioning screw 252 to turnably mount therein. By turning the second positioning screw 252 relative to the threaded hole 251, the second positioning screw 252 may extend into the seat post 25 by different lengths.

The connecting pin 30 is downward inserted sequentially into the seat post 25 of the second chassis part 20 and the connecting pin receiver 14 of the first chassis part 10, forming a second means to connect the first chassis part 10 to the second chassis part 20. The connecting pin 30 includes a long lower portion 31, a short upper portion 32, and a stop flange 321 between the lower and the upper portions 31, 32. A seat 40 is connected at a bottom to a top of the short upper portion 32 of the connecting pin 30, so that the seat 40 is located just above a center of a joint of the first and the second chassis parts 10 and 20.

Figure 6:
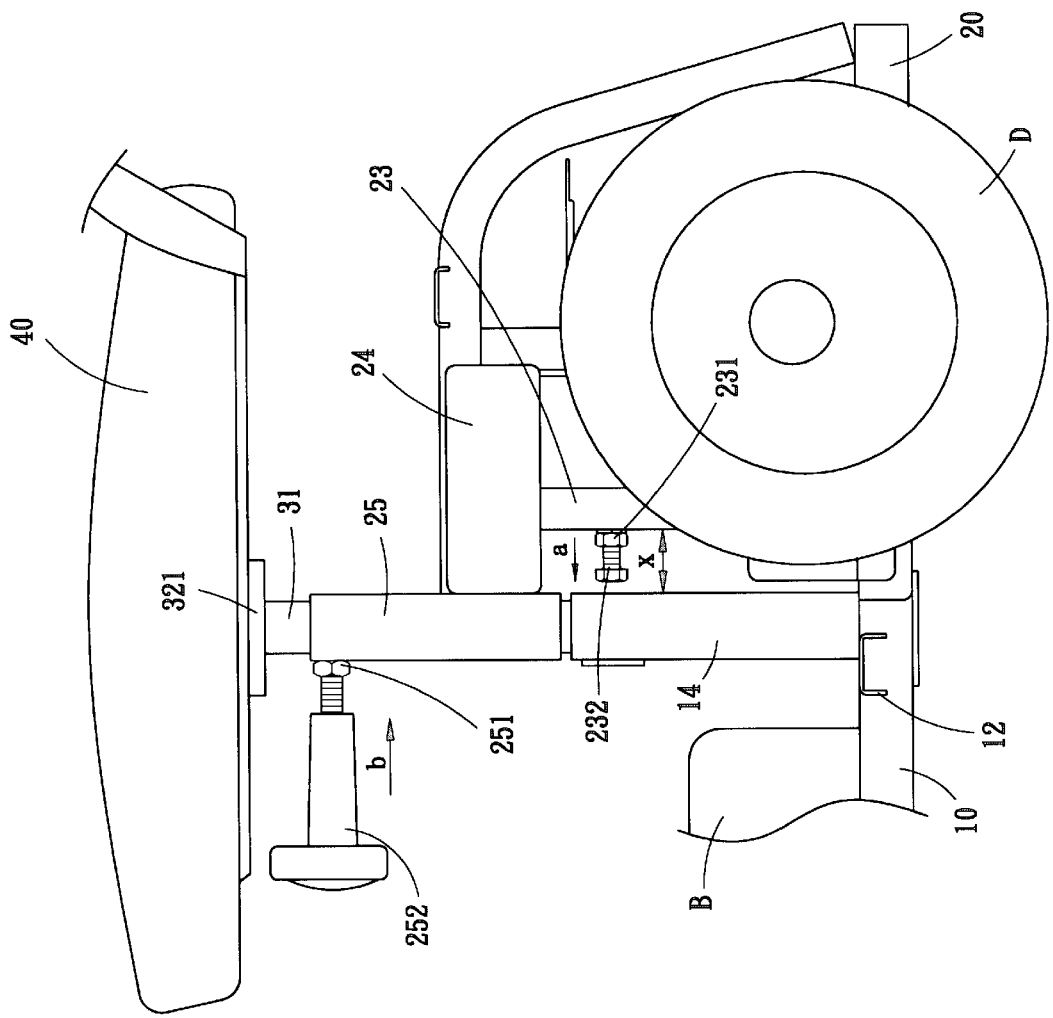
FIG. 6 is an enlarged, fragmentary side view of the present invention showing a first positioning screw provided on the second or rear chassis part has not been adjusted to a position for firmly pressing against a connecting pin receiver included in the first or front chassis part.
Figure 7:
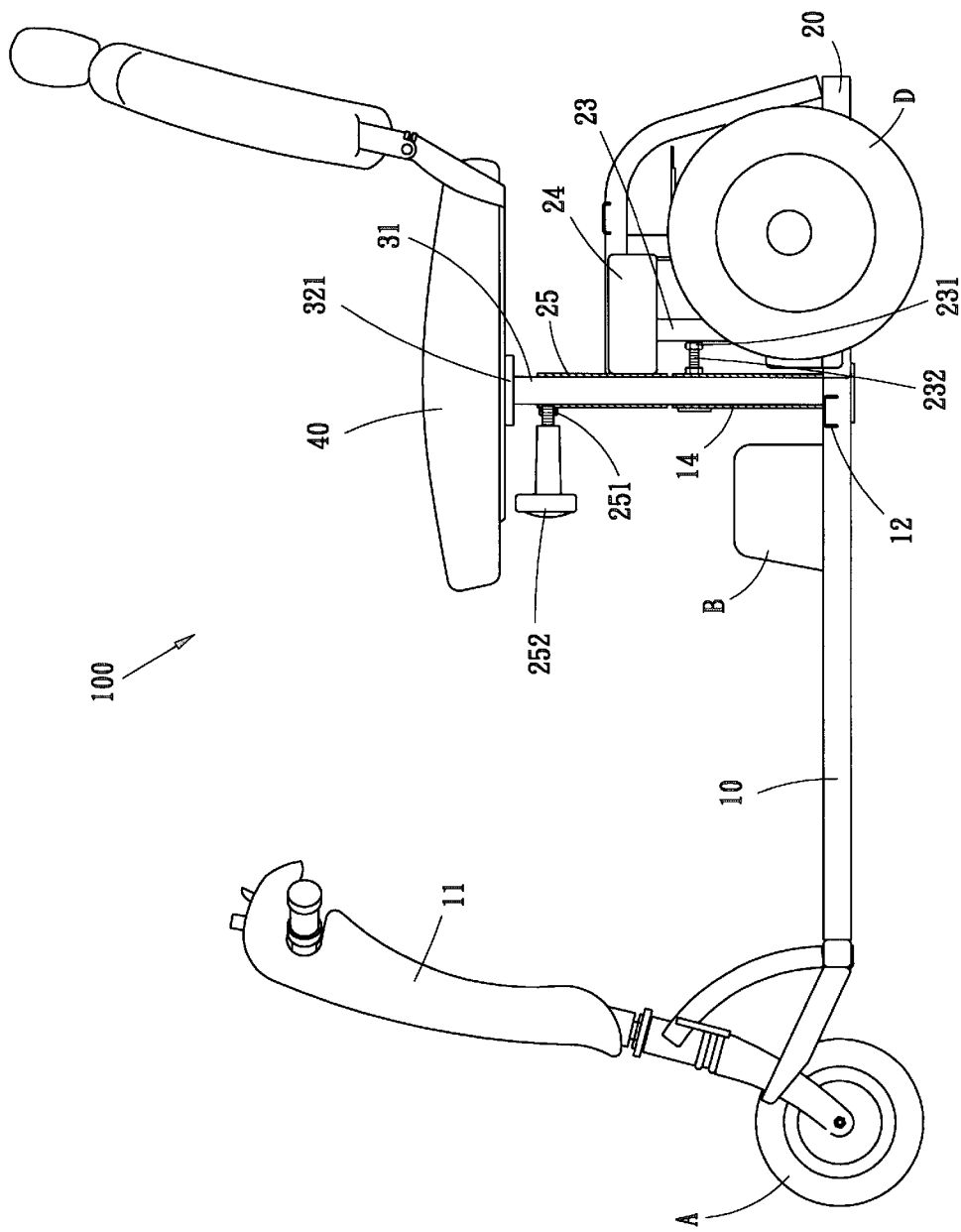
FIG. 7 is a partially sectional side view of the present invention showing the first positioning screw on the second or rear chassis part has been adjusted to a position for tightly pressing against the connecting pin receiver of the first or front chassis part, and a second positioning screw has been adjusted to firmly locate a connecting pin in a seat post included in the second or rear chassis part.

Please now refer to FIGS. 6 and 7. After the first and the second chassis parts 10 and 20 are connected to one another by inserting the connecting pin 30 into the seat post 25 and the connecting pin receiver 14, the first positioning screw 232 on the supporting post 23 of the second chassis part 20 may be turned so that it moves in a direction as indicated by the arrow "a" (see FIG. 6) until a length of the first positioning screw 232 outside the supporting post 23 reaches the distance "X" between the connecting pin receiver 14 and the supporting post 23 and a head of the first positioning screw 232 tightly presses against a rear wall of the connecting pin receiver 14 (see FIG. 7). The 25 first positioning screw 232 not only forms a basis or central line for correcting the connection of the first and the second chassis parts 10, 20 in line, but also enables adjustment of connection tightness between the two chassis parts 10 and 20 to obtain the most stable connection possible.

On the other hand, the second positioning screw 252 on the front wall of the seat post 25 may be turned so that it moves in a direction as indicated by the arrow "b" (see FIG. 6) until an inner end of the second positioning screw 252 extending into the seat post 25 firmly presses against the connecting pin 30 received in the seat post 25 (see FIG. 7). The second positioning screw 252 provides another force to further enhance a strong and stable connection of the first and the second chassis parts 10, 20 to one another, and enables the seat 40 to be firmly connected to the whole framework 100 of the electric cart and therefore allow safe manipulation of the electric cart by an operator sitting on the seat 40. Meanwhile, an operator's weight falling on the seat 40 produces a downward torque that is helpful in even tighter association of the first chassis part 10 with the second chassis part 20.

Figure 8:
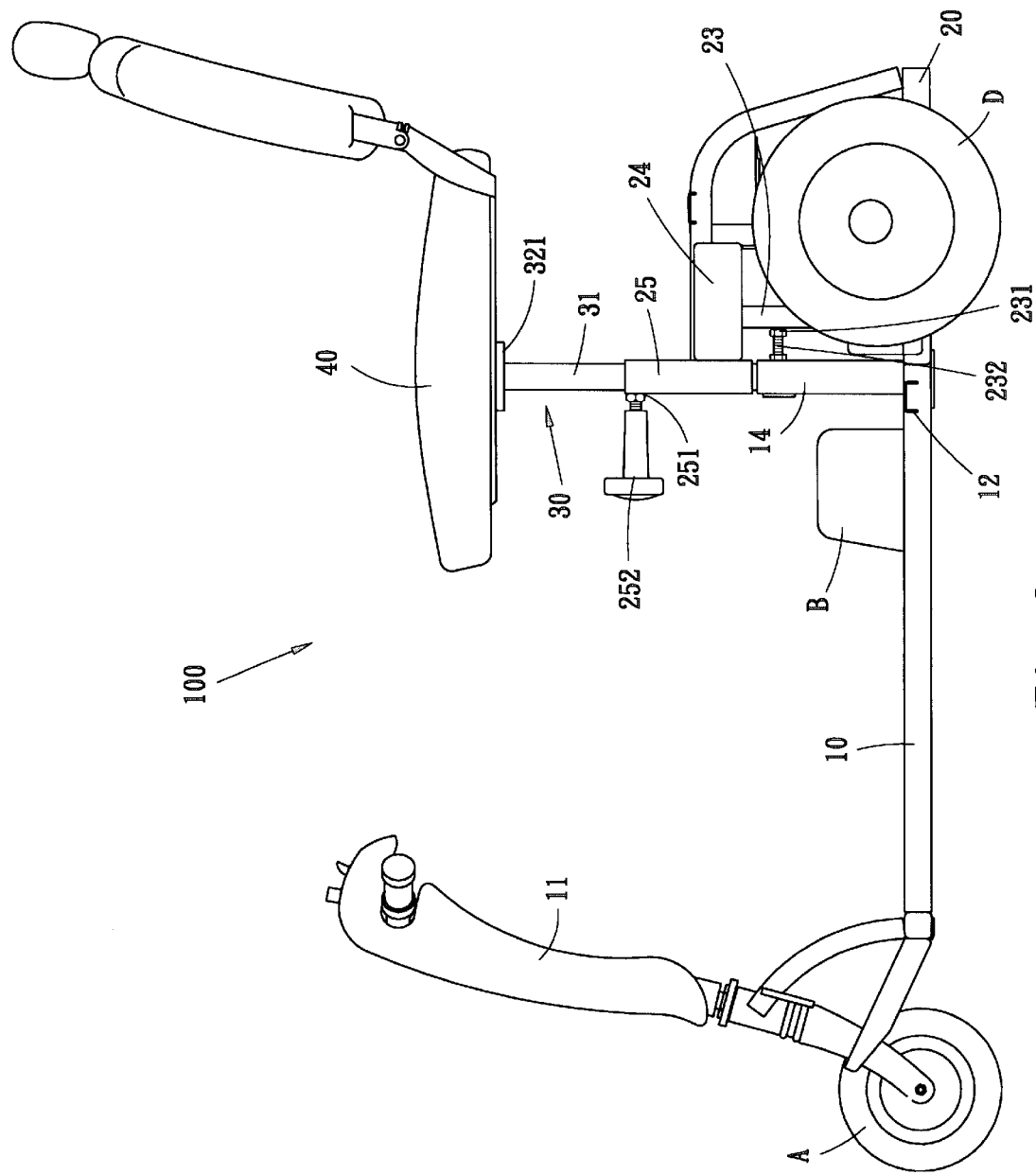
FIG. 8 is a side view of the present invention showing the seat is adjusted to a higher position relative to the chassis parts through adjustment of the second positioning screw.
Figure 9:
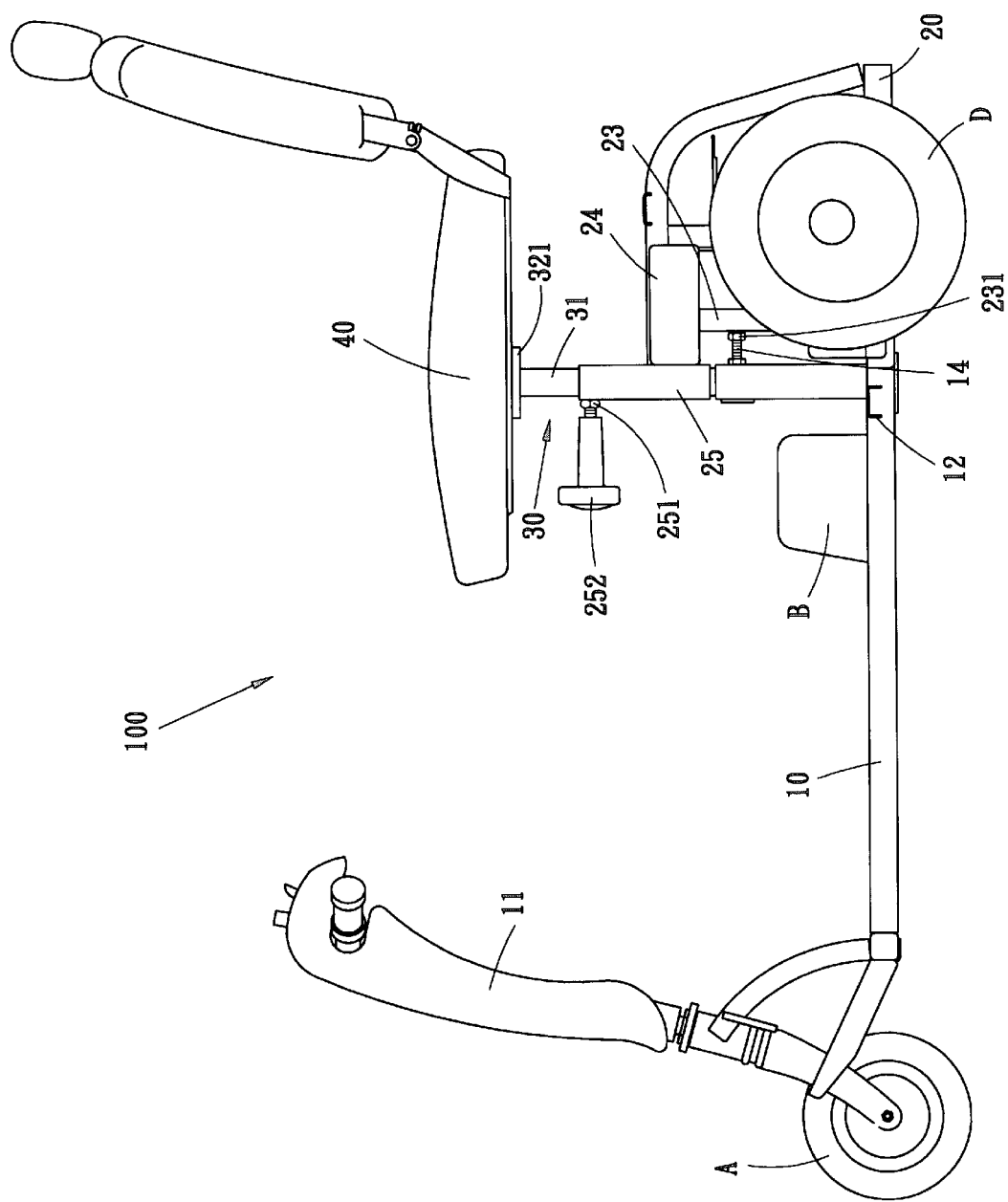
FIG. 9 is another side view of the present invention showing the seat is adjusted to a lower position relative to the chassis parts through adjustment of the second positioning screw.

FIGS. 8 and 9 illustrate the manner of adjusting the height of the seat 40 relative to the whole framework 100. By loosening the second positioning screw 252 on the front of the seat post 25 of the second chassis part 20 to a suitable extent, the connecting pin 30 is allowed to slide up and down in the seat post 25 and the connecting pin receiver 14. When the seat 40 connected to the upper portion 32 of the connecting pin 30 is adjusted to a desired height, the second positioning screw 252 is tightened again to lock the connecting pin 30 in place within the seat post 25 and the connecting pin receiver 14. FIG. 8 illustrates the seat 40 having been adjusted to a high position, that is, the connecting pin 30 is in an upward extended state, and FIG. 9 illustrates the seat 40 having been adjusted to a position lower than that in FIG. 8. In brief, the seat 40 can be freely adjusted to any desired height and be stably locked in place. More particularly, the seat 40, no matter what height it is at, it will always be firmly connected to the chassis parts 10 and 20 under a forward and a backward force acted on the connecting pin receiver 14 and the seat post 25, respectively, by the first and the second positioning screws 232 and 252, respectively. The electric cart with the detachable framework 100 can therefore be widely used by operators of different heights.

Figure 10:
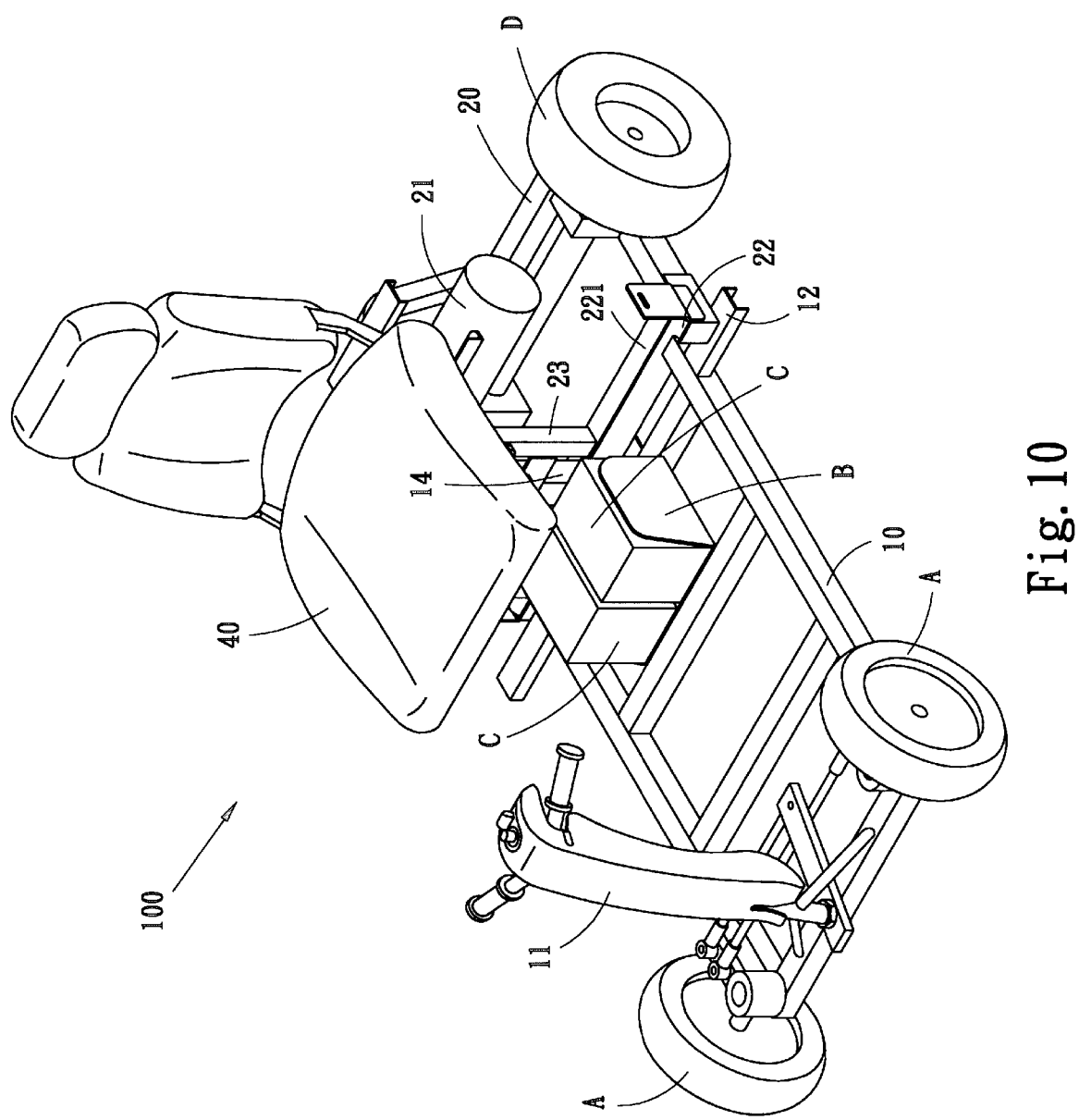
FIG. 10 is a perspective showing the detachable framework of the present invention being used with a four-wheel electric cart.

As shown FIG. 10, the detachable framework 100 of the present invention is also applicable to a four-wheel electric cart to achieve the same good effect.

The present invention is characterized in that it employs simplest but most effective connection structure to allow two chassis parts forming a framework for an electric cart, either a three-wheel or a four-wheel cart, to be repeatedly dismounted and/or assembled without adversely affecting the firm and stable connection thereof for good manipulation and control thereof on a long-term basis. For instance, the chassis parts 10 and 20 would not rotate about a main axis of the framework relative to one another, and the seat 40 would not swing forward or backward. The electric cart with the detachable framework 100 of the present invention is therefore more reliable and practical for use.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A detachable framework for an electric cart, comprising a first chassis part, a second chassis part, and connecting pin; said first chassis part including a steering handle mounted at a front end thereof for controlling a moving direction of a front wheel, a connecting beam provided at a lower rear end thereof, and a connecting pin receiver upward extended from a middle point of said connecting beam; said second chassis part having two rear wheels connected to two lateral sides thereof and a driving mechanism mounted thereon, said second chassis part including two receiving heads formed at two lower front ends thereof for correspondingly receiving two lateral ends of said connecting beam of said first chassis part, a supporting post upward extending from a middle front of said second chassis part and having a first positioning screw turnably mounted to a front wall thereof, and a seat post located in front of and above said supporting post together with said connecting pin receiver of said first chassis part form a continuous hollow channel when said first chassis part is connected to said second chassis part; and
said connecting pin being slidably received in said hollow channel formed by said seat post and said connecting pin receiver with a seat connected to a top thereof; and said seat post being provided at a front wall with a second positioning screw that may be turned to extend into said seat post and tightly press against said connecting pin;
whereby when said first positioning screw on said supporting post of said second chassis part is turned to extend from said supporting post and tightly press against a rear wall of said connecting pin receiver and said second positioning screw on said seat post of said second chassis part is turned to tightly press against said connecting pin in said seat post, said first and said second chassis parts are subjected to a forward and a backward force acted on the same straight line at the same time by said first and said second positioning screw, respectively, to cause them firmly associate with one another without the possibility of shifting sideward relative to one another.

2. A detachable framework for an electric cart as claimed in claim 1, wherein said first chassis part has a battery receiver and batteries mounted thereon.

3. A detachable framework for an electric cart as claimed in claim 1, wherein said first chassis part has a major transverse beam provided at a rear end thereof.

4. A detachable framework for an electric cart as claimed in claim 3, wherein said connecting beam of said first chassis part is located behind said major transverse beam.

5. A detachable framework for an electric cart as claimed in claim 3, wherein said connecting beam of said first chassis part has a length slightly shorter than that of said major transverse beam.

6. A detachable framework for an electric cart as claimed in claim 1, wherein said receiving heads of said second chassis part are in the form of two recesses.

7. A detachable framework for an electric cart as claimed in claim 1, wherein said second chassis part has a transverse beam provided at a front end thereof.

8. A detachable framework for an electric cart as claimed in claim 7, wherein said supporting post of said second chassis part upward extends from a middle point of said transverse beam of said second chassis part.

9. A detachable framework for an electric cart as claimed in claim 1, wherein said supporting post of said second chassis part is provided at its front wall with a screw seat for turnably receiving said first positioning screw therein.

10. A detachable framework for an electric cart as claimed in claim 1, wherein said supporting post of said second chassis part and said connecting pin receiver of said first chassis part together define a distance between them.

11. A detachable framework for an electric cart as claimed in claim 1, wherein said supporting post of said second chassis part has a horizontal supporting member connected to a top thereof to extend in a longitudinal direction of said framework.

12. A detachable framework for an electric cart as claimed in claim 11, wherein said seat post of said second chassis part is perpendicularly connected to a front end of said horizontal supporting member and upward extends therefrom.

13. A detachable framework for an electric cart as claimed in claim 1, wherein said seat post of said second chassis part is provided at its front wall with a threaded hole for receiving said second positioning screw therein.

14. A detachable framework for an electric cart as claimed in claim 1, wherein said connecting pin includes a long lower portion for insertion into said seat post and said connecting pin receiver.

15. A detachable framework for an electric cart as claimed in claim 1, wherein said connecting pin includes a short upper portion, and to a top of which said seat is connected.

16. A detachable framework for an electric cart as claimed in claim 15, wherein said connecting pin includes a stop flange provided below said short upper portion.

17. A detachable framework for an electric cart as claimed in claim 1, wherein said electric cart may be either a three-wheel or a four-wheel electric cart.

* * * * *